United States Patent
Li et al.

(10) Patent No.: US 11,782,301 B2
(45) Date of Patent: Oct. 10, 2023

(54) CURVED SCREEN AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Hui Li, Mianyang (CN); Baohong Kang, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/987,896

(22) Filed: Nov. 16, 2022

(65) Prior Publication Data
US 2023/0168531 A1  Jun. 1, 2023

(30) Foreign Application Priority Data

Nov. 30, 2021  (CN) .......................... 202111444324.0

(51) Int. Cl.
*G02F 1/1333* (2006.01)
*G02F 1/1335* (2006.01)
*G02F 1/1362* (2006.01)
*G02F 1/1368* (2006.01)

(52) U.S. Cl.
CPC ...... *G02F 1/133354* (2021.01); *G02F 1/1368* (2013.01); *G02F 1/133357* (2021.01); *G02F 1/133514* (2013.01); *G02F 1/136286* (2013.01)

(58) Field of Classification Search
CPC .................................................... G02F 1/1333
See application file for complete search history.

(56) References Cited

U.S. PATENT DOCUMENTS

| | | | | |
|---|---|---|---|---|
| 2006/0202206 A1* | 9/2006 | Koyama | ............. | H01L 27/1266 257/E29.295 |
| 2009/0213290 A1* | 8/2009 | Ochiai | ............. | G02F 1/136286 349/48 |
| 2013/0100382 A1* | 4/2013 | Chang | .................. | G02B 6/0038 362/621 |
| 2013/0235287 A1* | 9/2013 | Im | ......................... | G02B 6/0068 362/606 |
| 2017/0153515 A1* | 6/2017 | Kim | .................. | G02F 1/134327 |
| 2019/0302548 A1* | 10/2019 | Lee | .................... | G02F 1/133514 |
| 2020/0201108 A1* | 6/2020 | Li | ............................ | G03F 7/00 |
| 2022/0244586 A1* | 8/2022 | Zhao | ..................... | G02F 1/1339 |

FOREIGN PATENT DOCUMENTS

CN  1832179 A  9/2006

* cited by examiner

*Primary Examiner* — Sang V Nguyen

(57) ABSTRACT

A curved screen and a display device are disclosed. The curved screen includes a first substrate, a second substrate, and a liquid crystal layer disposed between the first and second substrates. The curved screen is bent and concave along the first substrate. The first substrate includes a substrate and a planarization layer disposed on a concave side of the substrate. A plurality of grooves are defined in the planarization layer and arranged at intervals along a direction of a bending edge of the curved screen, and extend in parallel along a direction of a non-bending edge. The depth of each groove before bending is greater than after bending.

7 Claims, 6 Drawing Sheets

CURVED SCREEN AND DISPLAY DEVICE

CROSS-REFERENCE TO RELATED APPLICATIONS

This application claims the priority and benefit of Chinese patent application 2021114443240, entitled "Curved Screen and Display Device" and filed Nov. 30, 2021, with China National Intellectual Property Administration, the entire contents of which are incorporated herein by reference.

TECHNICAL FIELD

The present application relates to the field of display technology, and in particular, to a curved screen and a display device.

BACKGROUND

The description provided in this section is intended for the mere purpose of providing background information related to the present application but doesn't necessarily constitute prior art.

With the development of display technology, Thin Film Transistor-Liquid Crystal Display (TFT-LCD) has become the mainstream display used in daily life and work. It has advantages of low cost, mature production techniques, and consummate upstream and downstream supporting facilities. TFT-LCD has experienced the development in different eras, and a curved screen is derived from a flat screen. A curved TV allows every point on the screen to reach the eye at an equal distance, allowing viewers to enjoy a good viewing experience with the edges. The curved screen TV can bring the audience a wider field of view and a thrill feeling, showing that the curved screen design not only changes the appearance of traditional TVs, but also further improves the viewing effect. However, so far, the production process of the curved screen consists in fixing a flat LCD display screen to a template of the display by bending it with an external force in order to assemble it into a TV.

Specifically, when the display panel changes from a flat shape to a shape curved, for example, the inner side of the color filter substrate is stretched under stress and meanwhile the inner side of the array substrate is compressed due to stress. Because the planarization layer is relatively thicker so that it forms irregular bumps after being squeezed by stress, causing the alignment of the liquid crystal at this position to be different from other normal positions, thereby resulting in light leakage, and vice versa, affecting the display effect after the curved screen is bent. Therefore, those skilled in the art need to provide a solution to alleviate or solve this problem.

SUMMARY

In view of the above, it is a purpose of the present application to provide a curved screen, so that the display effect of the curved screen will not be significantly affected while the viewing angle is superior.

The present application discloses a curved screen, including a first substrate, a liquid crystal layer and a second substrate. The curved screen is bent and concave along the first substrate. A liquid crystal layer is disposed between the first substrate and the second substrate. The first substrate includes a substrate and a planarization layer. The planarization layer is disposed on the concave side of the substrate. A plurality of grooves are defined in the planarization layer along a bending edge direction of the curved screen. The groove extends in a direction perpendicular to the bending direction. The depth of the groove before bending is greater than the depth of the groove after bending.

Optionally, the groove is a V-shaped structure.

Optionally, the first substrate includes a substrate, an insulating layer, a passivation layer, a color filter layer and a planarization layer. The insulating layer is disposed on the substrate. The passivation layer is disposed on the insulating layer. The color filter layer is disposed on the passivation layer. The planarization layer is disposed on the color filter layer. The thickness of the substrate is $L1$. The sum of the thicknesses of the insulating layer and the passivation layer is $L2$. The thickness of the color filter layer is $L3$. The thickness of the planarization layer is $L4$. The length of the curved screen along the bending edge is $X$, and the bending curvature is $K$. The number of the grooves is $H$, and the length of the grooves is consistent with the length of the curved screen perpendicular to the bending direction. The width of the groove along the bending edge is $a$, and the depth of the groove is $b$, then $ab \geq 2XK(L3+L4)(L1+L2+L3+L4)/H$.

Optionally, the grooves are strip-shaped grooves and are evenly arranged. After the curved screen is bent, the surface of the groove is a curved surface. The bending direction of the curved surface is consistent with the bending direction of the curved screen.

Optionally, the first substrate is an array substrate. The second substrate is a color filter substrate. The array substrate includes a substrate, an insulating layer, a plurality of data lines, a passivation layer and a planarization layer. The insulating layer is formed on the substrate. The plurality of data lines are arranged on the insulating layer. The passivation layer is formed on the data lines. The planarization layer is formed on the passivation layer. The light shielding portion corresponds to the data lines. The groove is provided in the planarization layer corresponding to each of the data lines. The curved screen further includes a light-shielding portion, and the light-shielding portion is located on the array substrate or the color filter substrate and is disposed corresponding to the data line.

Optionally, the first substrate is an array substrate. The second substrate is a color filter substrate. The array substrate includes a substrate, a plurality of columns of thin film transistors and a planarization layer. The plurality of columns of the thin film transistors are arranged on the substrate and arranged along a direction perpendicular to the bending direction. The planarization layer is disposed on the thin film transistor. The grooves are provided in the planarization layer corresponding to the positions of the thin film transistors in each column.

Optionally, the array substrate further includes a color filter layer, and the color filter layer is disposed between the passivation layer and the planarization layer. The color filter layer includes at least a first color filter and a second color filter. A connecting portion is disposed adjacent to the first color filterer and the second color filterer. The connecting portion is disposed corresponding to the data line and the light shielding portion. The planarization layer is provided with the groove corresponding to the connecting portion.

Optionally, the first substrate is a color filter substrate. The second substrate is an array substrate. The color filter substrate includes a substrate, a color filter layer and a planarization layer. The color filter layer is formed on the substrate. The planarization layer is formed on the color filter layer. The color filter layer includes at least a first color filter and a second color filter. A connecting portion is disposed adjacent to the first color filterer and the second color filterer. The planarization layer is provided with the groove corresponding to the connecting portion.

Optionally, the depth of the groove is 0.1 um-1 um, and the width of the groove along the bending direction is 2 um-20 um.

The present application further discloses a display device comprising a curved screen and a backlight module, wherein the curved screen is installed on one side of the backlight module, and the backlight module provides a backlight source for the curved screen.

Compared with the related art in which a bulge is generated during bending and the position of the bulge is uncontrollable, in the present application, a plurality of grooves are provided in the planarization layer along the bending direction of the curved screen. Because the surface of the curved screen is subjected to stress extrusion when the curved screen is bent, it can improve the situation in which the planarization layer is relatively thick and the film layer is likely to form irregular bulges after extrusion. First of all, the existence of the grooves makes the position where the stress concentrates controllable during bending. When bending, the compression of the substrate is concentrated at the position of the groove, and we can control the position of the "bump" that is prone to display problems, so as to reduce the influence of the display problem on the actual display effect (for example, the groove can be disposed in the non-display area or the position of the light-shielding structure). Furthermore, with such a design, the depth of the groove after the bending is smaller than that before the bending, so as to offset the compressive force of the bending and reduce the occurrence of bulges. The problem of uneven cell thickness after bending can be improved, so that while the viewing angle of the curved screen 100 is excellent, the display effect will not be significantly affected.

BRIEF DESCRIPTION OF DRAWINGS

The accompanying drawings, which are included to provide a further understanding of the embodiments of the present application, constitute a part of the specification, are used to illustrate the embodiments of the present application, and together with the entirely of the written description, serve to explain the principles of the present application. Obviously, the drawings used in the following description merely depict some embodiments of the present application, and for those having ordinary skill in the art, other drawings can also be obtained from these drawings without investing creative effort. In the drawings.

Figure 1:
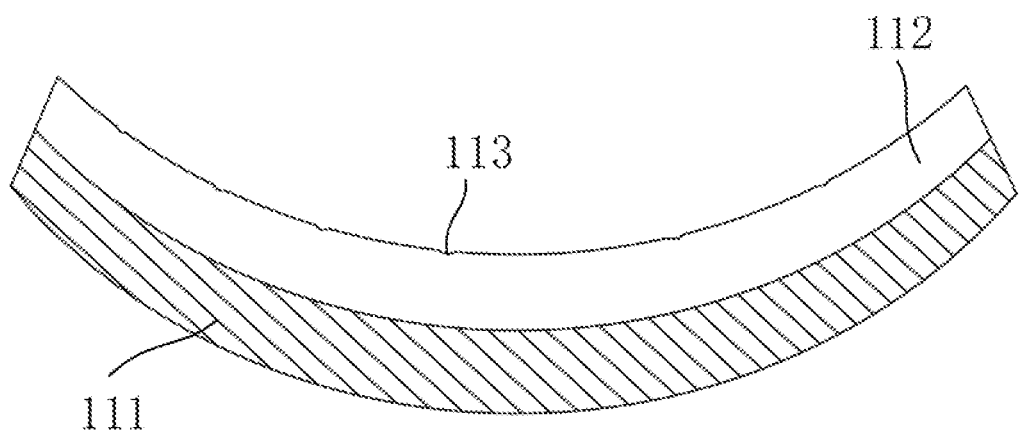
FIG. 1 is a schematic diagram of a curved screen provided by a first embodiment of the present application.

In the drawings: 10, display device; 100, curved screen; 110, first substrate; 111, substrate; 112, planarization layer; 113, groove; 114, first groove; 115, second groove; 116, insulating layer; 117, passivation layer; 118, color filter layer; 119, thin film transistor; 120, data line; 121, first color filter; 122, second color filter; 123, connecting portion; 130, second substrate; 131, light shielding portion; 140, liquid crystal layer; 200, backlight module.

DETAILED DESCRIPTION OF EMBODIMENTS

It should be understood that the terminology used herein, the specific structural and functional details disclosed are intended for the mere purpose of describing specific embodiments and are relatively representative, which should however not be construed as limited only the embodiments set forth herein.

In the description of this application, the terms "first" and "second" are merely used for description purposes, and cannot be understood as indicating relative importance, or implicitly indicating the number of indicated technical features. Thus, unless otherwise specified, features defined as "first" and "second" may expressly or implicitly include one or more of the features; "plurality" means two or more. The terms "including", "comprising", and any variations thereof are intended to mean a non-exclusive inclusion, namely one or more other features, integers, steps, operations, units, components and/or combinations thereof may be present or added.

In addition, terms such as "center", "transverse", "lateral", "above", "on", "under", "below", "left", "right", "vertical", "horizontal", "top", "bottom", "inside", "out-side", etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts The present application will be described in detail below with reference to the accompanying drawings and optional embodiments.

First Embodiment

Figure 2:
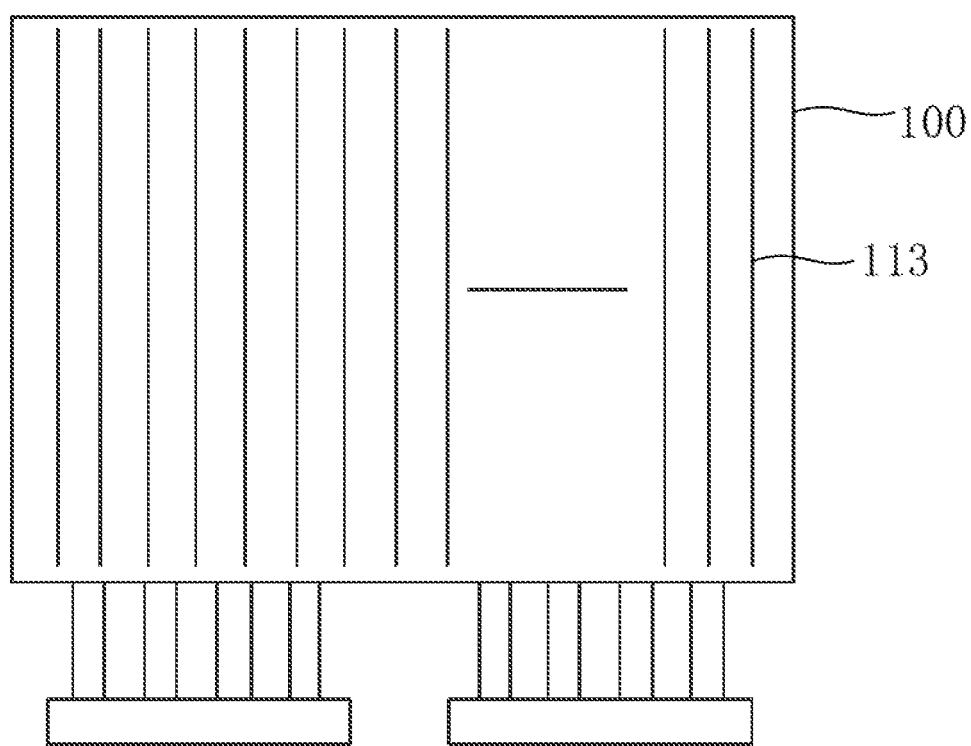
FIG. 2 is a schematic top view of a curved screen provided by the first embodiment of the present application.
Figure 3:
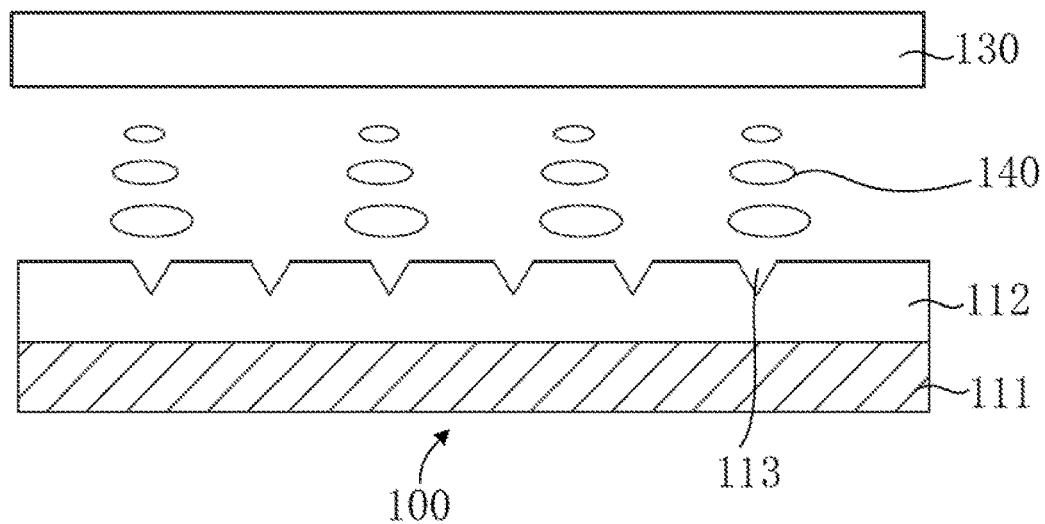
FIG. 3 is a schematic diagram of a cross-sectional structure of a curved screen provided by the first embodiment of the present application.

FIG. 1 is a schematic diagram of a curved screen provided by a first embodiment of the present application. FIG. 2 is a schematic top view of a curved screen provided by the first embodiment of the present application. FIG. 3 is a schematic diagram of a cross-sectional structure of a curved screen provided by the first embodiment of the present application. As shown in FIG. 2, the present application discloses a curved screen. The curved screen has four sides, where the upper and lower sides are bending edges, and the left and right sides are non-bending edges. A plurality of grooves are arranged in parallel along the direction of the non-bending edge. The length of each of the plurality of grooves is the length extending along the non-bending edge of the curved screen, and the width of the groove is the width along the direction of the bending edge. In particular, referring to FIGS. 1-3, a curved screen 100 includes a first substrate 110, a liquid crystal layer 140 and a second substrate 130. The curved screen is bent and concave along the first substrate. A liquid crystal layer 140 is disposed between the first substrate 110 and the second substrate 130. The first substrate 110 includes a substrate 111 and a planarization layer 112. The planarization layer 112 is disposed on the concave side of the substrate 111. A plurality of grooves 113 are provided in the planarization layer 112 along the direction of the bending edge of the curved screen 100, and the grooves 113 extend in a direction perpendicular to the direction of the bending edge. The depth of the groove 113 before bending is greater than the depth of the groove 113 after bending.

In the present application, a plurality of grooves 113 are provided in the planarization layer 112 along the bending direction of the curved screen 100. Because the surface of the curved screen 100 is subjected to stress extrusion when the curved screen 100 is bent, it can improve the situation in which the planarization layer 112 is relatively thick and the film layer is likely to form irregular bulges after extrusion. First of all, the existence of the grooves 113 makes the position where the stress concentrates controllable during bending. When bending, the compression of the substrate is concentrated at the position of the groove 113, and we can control the position of the "bump" that is prone to display problems, so as to reduce the influence of the display problem on the actual display effect (for example, the groove 113 can be disposed in the non-display area or the position of the light-shielding structure). Furthermore, with such a design, the depth of the groove 113 after the bending is smaller than that before the bending, so as to offset the compressive force of the bending and reduce the occurrence of bulges. The problem of uneven cell thickness after bending can be improved, so that while the viewing angle of the curved screen 100 is excellent, the display effect will not be significantly affected.

Specifically, the groove 113 is a V-shaped structure. The groove 113 of the V-shaped structure has a large accommodating width and has only one corner. In this way, during the bending process, the two groove walls of the groove 113 are adjacent to each other along the bending direction and then closed. The V-shaped shape closes more tightly and is more uniform, and it is not easy to cause bulge after bending. Even if there is a bulge after bending, the positioning of the bulge is more controllable and is a unique position, so that the follow-up repair is relatively more targeted. Of course, the groove 113 may not adopt a V-shaped structure, but may adopt an arc-shaped structure, a concave-shaped structure or a U-shaped structure, etc., as long as there is enough space for accommodating stress and the deformation of the groove 113 can be relatively uniform when the curved screen 100 is bent, so that the film structure is relatively flat after the curved screen 100 is bent, and no bulge occurs.

Figure 4:
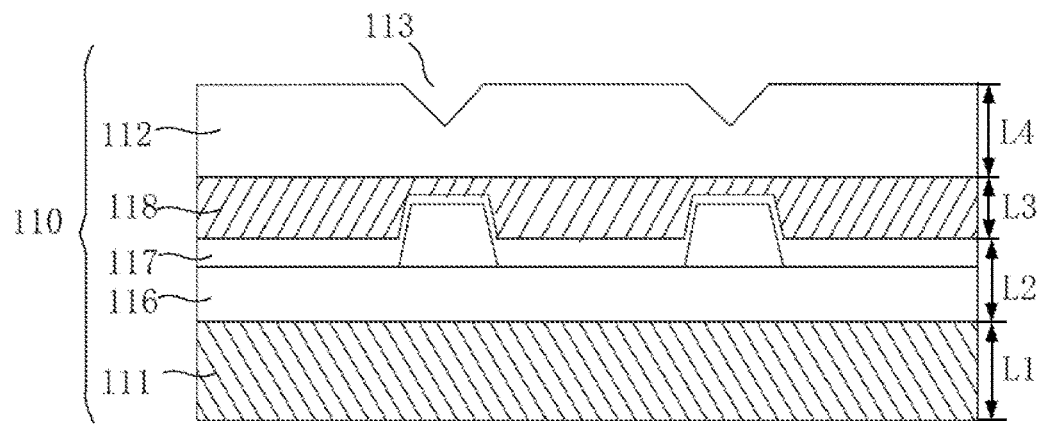
FIG. 4 is a schematic diagram of a first substrate provided by the first embodiment of the present application.

Further, FIG. 4 is a schematic diagram of the first substrate provided by the first embodiment of the present application. As shown in FIG. 4, the first substrate 110 includes a substrate 111, an insulating layer 116, a passivation layer 117, a color filter layer 118 and a planarization layer 112. The insulating layer 116 is disposed on the substrate 111. The passivation layer 117 is disposed on the insulating layer 116. The color filter layer 118 is disposed on the passivation layer 117. The planarization layer 117 is disposed on the color filter layer 118. The thickness of the substrate 111 is L1. The sum of the thicknesses of the insulating layer 116 and the passivation layer 117 is L2. The thickness of the color filter layer 118 is L3. The thickness of the planarization layer 112 is L4. The length of the curved screen 100 along the bending edge is X. The curvature of the bend is K. The number of the grooves 113 is H. The length of the groove 113 is consistent with the length of the curved screen 100 perpendicular to the bending direction. The width of the groove 113 along the bending edge is a and the depth is b, so $ab \geq 2XK(L3+L4)(L1+L2+L3+L4)/H$.

Specifically, in the case of a flat screen, the volume of the first substrate 110 of the display panel is V1 and the length is X, and $V1 = X*Y(L3+L4)$.

After the display panel is bent, there is no bulge and the inner side of the first substrate 110 is flat, the volume of the first substrate 110 is V2. The length of the outer surface of the first substrate 110 of the display panel after bending is X, and the length of the inner surface is X1, $V2 = X1*Y*(L3+L4)$, $X1 = X/2\pi * 1/K(1/K - L1 - L2 - L3 - L4)$.

Therefore, the volume difference before and after bending: $\Delta V = X*Y(L3+L4)K(L1+L2+L3+L4)$, and the volume difference of this part is the total volume of all grooves 113.

Therefore, according to the total volume of the grooves 113, the cross-sectional area of the grooves 113 can finally be calculated as $ab \geq XK(L3+L4)(L1+L2+L3+L4)/H$. Furthermore, for example, the number of grooves 113 may be equal to the number of data lines 120, etc., which can be selected depending on specific conditions. Theoretically, the groove 113 calculated in this way can make the sidewalls of the groove 113 completely closed under the bending state, which can ensure that the size of the groove 113 can be changed within a controllable range. When the screen is changed from straight to curved, the film layer will not be raised, and at this time $ab = XK(L3+L4)(L1+L2+L3+L4)/H$.

The depth of the groove 113 is 0.1 um-1 um, and the width of the groove 113 along the bending direction is 2 um-20 um. In this way, it is possible to choose the size of the groove 113 to be dug according to the size range of the groove, and the size of the groove 113 can be set accurately according to the size of the curvature of the curved screen 100, and the precision is relatively higher. In some embodiments, the depth of the groove 113 is 0.4 um, and the width of the groove 113 along the bending direction is 8 um.

Optionally, the grooves 113 are strip-shaped grooves and are evenly arranged. After the curved screen 100 is bent, the surface of the groove 113 is a curved surface, and the bending direction of the curved surface is consistent with the bending direction of the curved screen 100. That is, referring to the above formula, the groove 113 can be designed to be slightly larger namely $ab > 2XK(L3+L4)(L1+L2+L3+L4)/H$, so that when the curved screen 100 is bent, the film layers are squeezed against each other and the groove 113 has enough space to release the stress, while ensuring that the deformation of the groove 113 after bending is just within the prepared bending space, so that the possibility of the film layer bulging due to the change of topography after bending can be reduced. In addition, the grooves are strip-shaped grooves and are evenly arranged, so that the extrusion stress of the curved screen is relatively concentrated when it is bent, and the effect of stress relief is better. In this way, when the curved screen is bent, each strip-shaped groove is synchronously closed, which can release the extrusion stress more uniformly, and avoid causing a bulge at a single position to affect the display effect.

Second Embodiment

Figure 5:
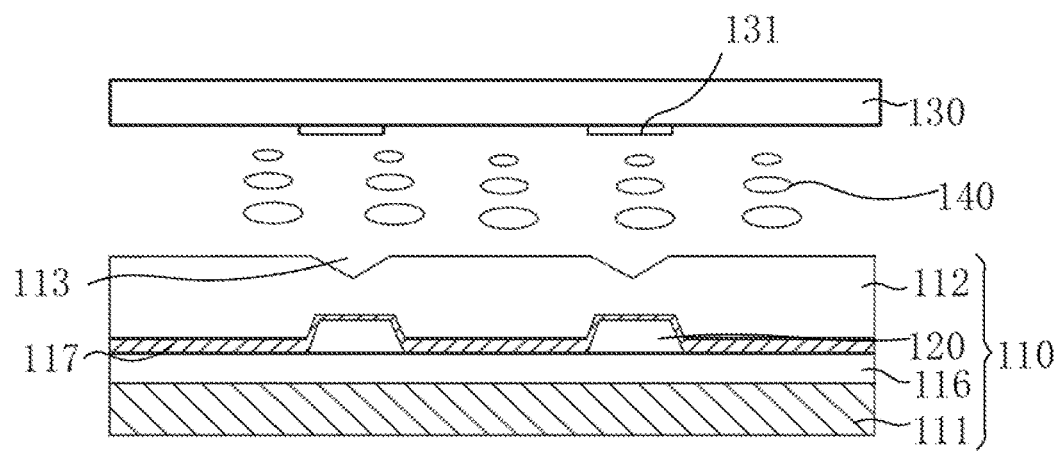
FIG. 5 is a schematic diagram of a cross-sectional structure of a curved screen provided by a second embodiment of the present application.

FIG. 5 is a schematic diagram of a cross-sectional structure of a curved screen provided by a second embodiment of the present application. As shown in FIG. 5, the difference between this embodiment and the first embodiment is that the first substrate 110 is an array substrate, and the second substrate 130 is a color filter substrate. The array substrate includes a substrate 111, an insulating layer 116, a plurality of data lines 120, a passivation layer 117 and a planarization layer 112. The insulating layer 116 is formed on the substrate 111. The plurality of data lines 120 are disposed on the insulating layer 116. The passivation layer 117 is formed on the data line 120. The planarization layer 112 is formed on the passivation layer 117. The groove 113 is provided in the planarization layer 112 corresponding to each of the data lines 120. The curved screen 100 further includes a light shielding portion 131, the light shielding portion 131 is located on the array substrate or the color filter substrate, and is disposed corresponding to the data line 120. The data line 120 is arranged perpendicular to the bending direction of the curved screen 100. In addition, the position of the data line 120 is also relatively prone to bulge. Correspondingly, the groove 113 is provided at the position of each data line 120, which can reduce the bulge problem at the position of the data line 120. In addition, the position of the data line 120 is provided with a light shielding portion 131, and the light shielding portion 131 can also be used to improve the problem of uneven display of the groove 113. Furthermore, the arrangement of the data lines 120 is also uniform, so the spacing of the grooves 113 on the curved screen 100 is also uniform. When the curved screen 100 is bent, stress is generated by extrusion between the film layers, and the uniformly arranged grooves 113 also release the generated stress uniformly at this time. Through each groove 113, the stress generated by extrusion can be uniformly dispersed, which can prevent the phenomenon that a certain position of the film layer bulges due to uneven release of stress, and further ensures the flatness of the film layer topography after bending. Of course, the number of the data lines 120 and the number of the grooves 113 may be set in one-to-one correspondence or in proportion, for example, two data lines 120 are correspondingly provided with one groove 113.

Third Embodiment

Figure 6:
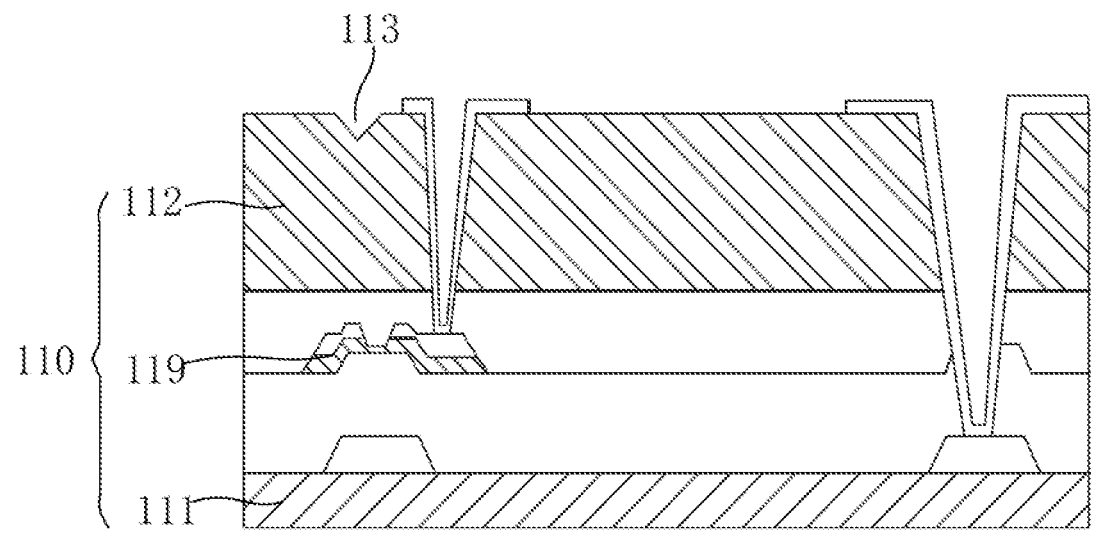
FIG. 6 is a schematic diagram of a cross-sectional structure of a curved screen provided by a third embodiment of the present application.

FIG. 6 is a schematic diagram of a cross-sectional structure of a curved screen according to a third embodiment of the present application. As shown in FIG. 6, the difference between this embodiment and the first and second embodiments is that the first substrate 110 is an array substrate, and the second substrate 130 is a color filter substrate. The array substrate includes a substrate 111, a plurality of columns of thin film transistors 119 and a planarization layer 112. The plurality of columns of the thin film transistors 119 are arranged on the substrate 111 and arranged along a direction perpendicular to the bending direction of the curved screen 100. The planarization layer 112 is disposed on the thin film transistor 119. The groovees 113 are provided in the planarization layer 112 corresponding to the positions of the thin film transistors 119 in each column. In this way, the array substrate is the outer substrate of the curved screen 100. The thin film transistors 119 in the array substrate are formed by stacking multiple layers, which so are prone to bulge due to extrusion during the bending process when the curved screen 100 is bent. Therefore, arranging the groovees 113 in the planarization layer 112 corresponding to the positions above the thin film transistors 119 of each column can prevent the positions where the thin film transistors 119 are stacked from being raised due to stress extrusion during bending. Thus, the performance of the thin film transistors 119 is not affected, thereby ensuring that the display effect of the curved screen 100 before and after the bending is basically the same.

The groovees 113 are arranged at the positions corresponding to the thin film transistors 119 and may be arranged in combination with the positions of the data lines 120. At this time, the grooves 113 can be set as short grooves. Of course, the grooves 113 may also be provided independently corresponding to the channels of the thin film transistors 119, and in this case, the grooves 113 run through the entire curved screen.

Fourth Embodiment

Figure 7:
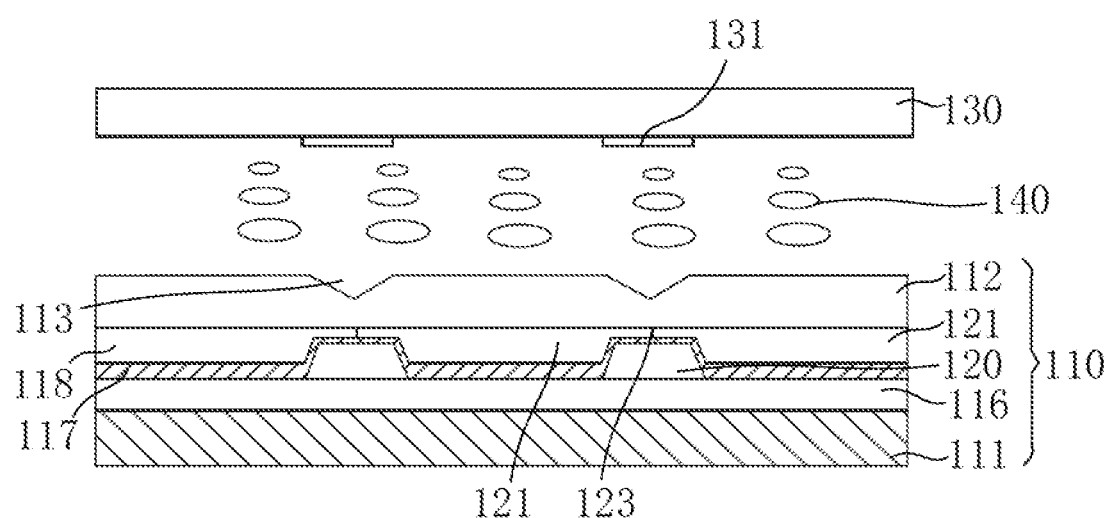
FIG. 7 is a schematic diagram of a cross-sectional structure of a curved screen provided by a fourth embodiment of the present application.

FIG. 7 is a schematic diagram of a cross-sectional structure of a curved screen provided by a fourth embodiment of the present application. As shown in FIG. 7, the difference between this embodiment and the first, second, and third embodiments is that the array substrate further includes a color filter layer 118. The color filter layer 118 is disposed between the passivation layer 117 and the planarization layer 112. The color filter layer 118 includes at least a first color filter 121 and a second color filter 122. A connecting portion 123 is disposed adjacent to the first color filter 121 and the second color filter 122. The connecting portion 123 is disposed corresponding to the data line 120 and the light shielding portion 131. The grooves 113 are formed in the planarization layer 112 corresponding to the connecting portions 123.

At the connecting portion 123 disposed adjacent to the first color filter 121 and the second color filter 122, they only abut but does not overlap. The groove 113 is provided at the abutting portion of the connecting part 123, which can prevent the curved screen 100 from being raised at the abutting portion after bending. Furthermore, at this time, the light shielding portion 131 is disposed corresponding to the position of the connecting portion 123, which can also prevent the risk of light leakage from the connecting portion 123 of the first color filter 121 and the second color filter 122, thereby double ensuring the display effect of the curved screen 100.

Figure 8:
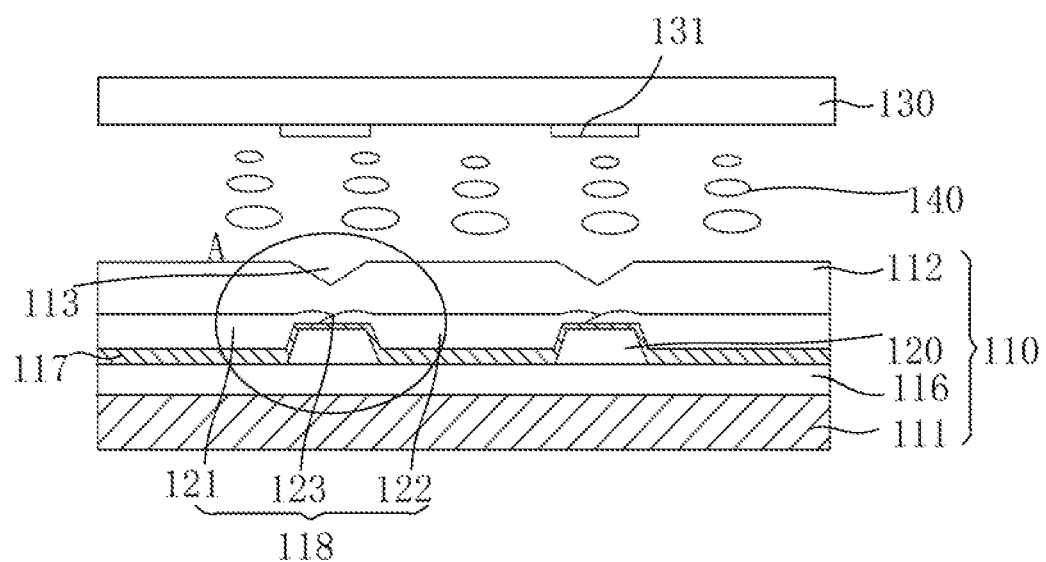
FIG. 8 is a schematic cross-sectional structure diagram of a curved screen in which a first color filter and a second color filter of the present application overlap each other.

Of course, the first color filter 121 and the second color filter 122 can also overlap each other. FIG. 8 is a schematic cross-sectional diagram of a curved screen in which the first color filter and the second color filter of the present application overlap each other. As shown in FIG. 8, at the connecting portion 123 disposed adjacent to the first color filter 121 and the second color filter 122, they overlap each other. At this time, the film layer at the overlapping portion of the connecting portion 123 is significantly thicker, and the probability of bulging at the overlapping portion of the two color filters after the curved screen 100 is bent is high. Therefore, the groove 113 is arranged above the corresponding position of the connecting portion 123, and the extrusion stress can be concentrated and changed in the groove 113 for the release of the extrusion stress of the film layer where the color filter overlaps due to bending, thereby preventing bulging at the overlap of two color filters due to bending.

Figure 9:
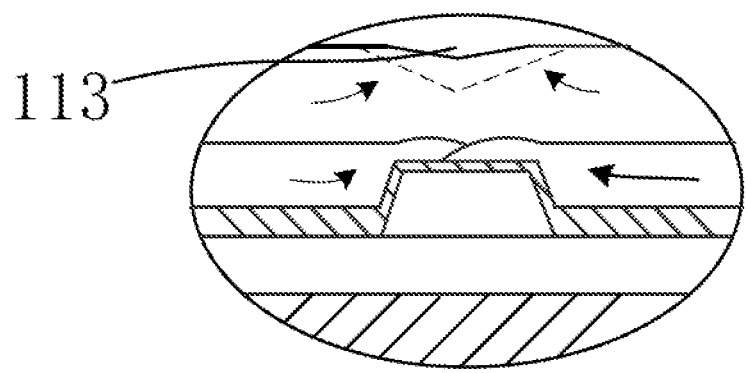
FIG. 9 is a schematic diagram of a groove in area A of FIG. 8 before and after bending.

FIG. 9 is a schematic diagram of the groove in the area A of FIG. 8 before and after bending. As shown in FIG. 9, the dotted line in the figure denotes the groove 113 before the curved screen is bent. The depth of the groove 113 after the curved screen 100 is bent will change due to the extrusion stress of the stacked film layers. Therefore, according to the design of the width and depth of the groove 113, the extrusion stress of the groove 113 after the curved screen 100 is bent can be changed within the range of the groove 113, so as to avoid the possibility of bulging as much as possible and ensure that the display effect is the same before and after bending.

Fifth Embodiment

Figure 10:
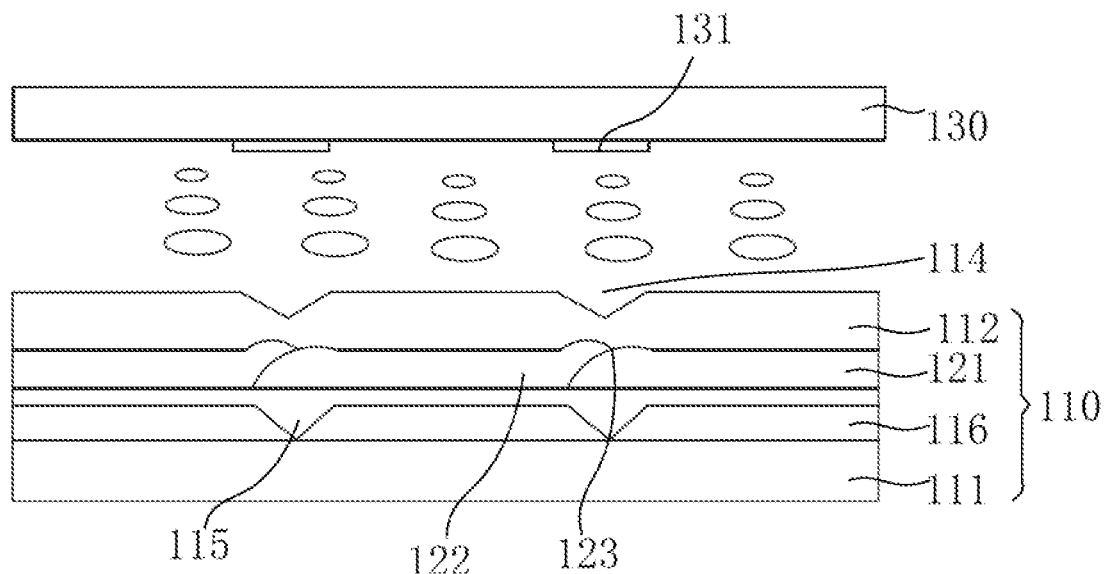
FIG. 10 is a schematic diagram of a cross-sectional structure of a curved screen provided by a fifth embodiment of the present application.

FIG. 10 is a schematic diagram of a cross-sectional structure of a curved screen provided by a fifth embodiment of the present application. As shown in FIG. 10, the present embodiment is different from the first, second, third and fourth embodiments in that the groove 113 includes a first groove 114 and a second groove 115. The first groove 114 is disposed in the planarization layer 112. The second groove 115 is disposed in the insulating layer 116. The first groove 114 and the second groove 115 correspond to the connecting portion 123. In this way, the film layer of the insulating layer 116 corresponding to the connecting portion 123 sinks, and the second groove 115 can release a part of the stress generated by the extrusion when the curved screen 100 is bent, and the change of the film layer the corresponding to the position where the color filters overlap due to extrusion is relatively smaller. The corresponding first groove 114 in the planarization layer 112 and the second groove 115 cooperate with each other to release the extrusion stress in the two film layers respectively, which can further ensure that the curved screen 100 is less likely to bulge at the overlap of the two color filters after bending, and ensures the flatness of the topography of the film layer after bending.

Sixth Embodiment

Figure 11:
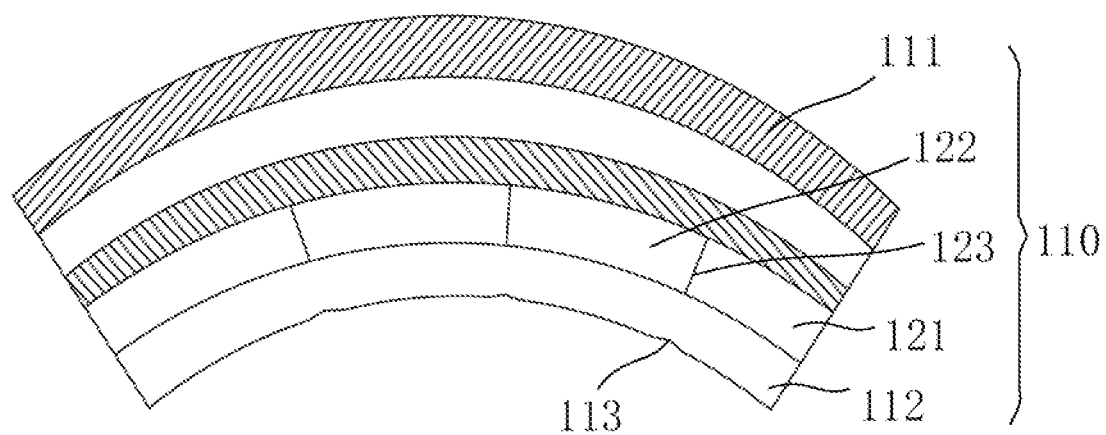
FIG. 11 is a schematic diagram of a curved screen provided by a sixth embodiment of the present application.
Figure 12:
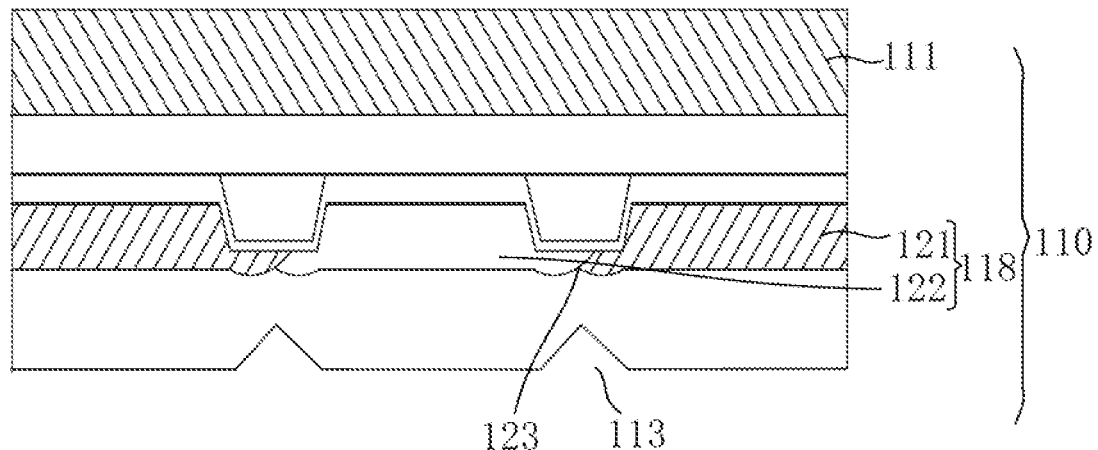
FIG. 12 is a schematic diagram of a cross-sectional structure of a curved screen provided by the sixth embodiment of the present application.

FIG. 11 is a schematic diagram of a curved screen provided by a sixth embodiment of the present application. FIG. 12 is a schematic diagram of a cross-sectional structure of a curved screen provided by the sixth embodiment of the present application. Referring to FIGS. 11-12, the difference between this embodiment and the first, second, third, fourth and fifth embodiments is that the bending direction of the curved screen 100 is compressed and bent along the inner side of the color filter substrate. The first substrate 110 is a color filter substrate. The second substrate 130 is an array substrate. The color filter substrate includes a substrate 111, a color filter layer 118 and a planarization layer 112. The color filter layer 118 is formed on the substrate 111. The planarization layer 112 is formed on the color filter layer 118. The color filter layer 118 includes at least a first color filter 121 and a second color filter 122. A connecting portion 123 is disposed adjacent to the first color filter 121 and the second color filter 122. The groove 113 is formed in the planarization layer 112 corresponding to the connecting portion 123. Because in the COA (Color-filter on Array) panel, the problem of bulging at the overlap between the two color filters in the color filter layer 118 is relatively serious. Therefore, grooves 113 are provided in the planarization layer 112 in the color filter substrate at a position corresponding to the connecting portion 123 between two adjacent color filters. When the curved screen 100 is bent, the groove 113 correspondingly changes the extrusion stress within the groove 113, which can prevent the connecting portion 123 from bulging due to extrusion, and prevent the risk of light leakage from the connecting portion 123, thereby ensuring the display effect of the curved screen 100.

Figure 13:
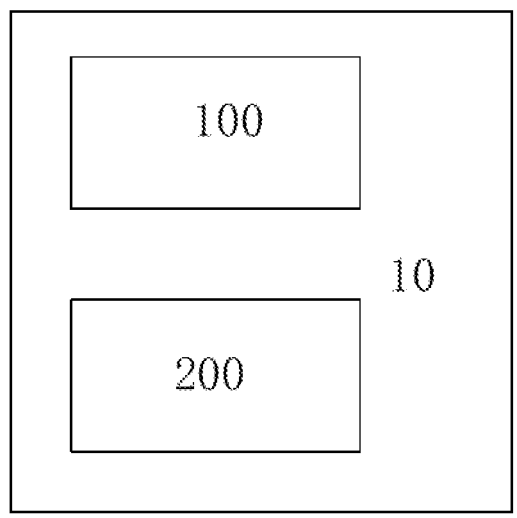
FIG. 13 is a schematic block diagram of a display device of the present application.

FIG. 13 is a schematic diagram of a display device of the present application. As shown in FIG. 13, the present application further discloses a display device 10 including a curved screen 100 and a backlight module 200. The curved screen 100 is installed on one side of the backlight module 200. The backlight module 200 provides a backlight source for the curved screen 100. The display device 10 provided with the curved screen 100 can make each point on the screen reach the same distance to the eyes, and the audience can also enjoy a good viewing experience from the edges. The display device 10 with the curved screen 100 can bring the audience a wider field of vision and thrill feeling.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

It should be noted that the inventive concept of the present application can also form other embodiments, and is not limited to the above description, but the length of the application documents is limited so that the embodiments cannot be enumerated one by one. For those having ordinary skill in the technical field of the present application, without departing from the scope and spirit of the present application, some simple deductions or substitutions can be made, which should all be regarded as falling in the scope of protection of the present application.

What is claimed is:

1. A curved screen, comprising a first substrate, a liquid crystal layer, and a second substrate;
    wherein the curved screen is bent and concave along the first substrate;
    wherein the liquid crystal layer is disposed between the first substrate and the second substrate;
    wherein the first substrate comprises a substrate and a planarization layer disposed on a concave side of the substrate;
    wherein a plurality of grooves are defined in the planarization layer and disposed at intervals along a direction of a bending edge of the curved screen, and extend in parallel along a direction of a non-bending edge;
    wherein a depth of each of the plurality of grooves before bending is greater after bending;
    wherein each of the plurality of grooves is of a V-shaped structure;
    wherein the first substrate further comprises an insulating layer, a passivation layer, and a color filter layer, in addition to the substrate and the planarization layer;
    wherein the insulating layer is disposed on the substrate, the passivation layer is disposed on the insulating layer, the color filter layer is disposed on the passivation layer, and the planarization layer is disposed on the color filter layer;

wherein a thickness of the substrate is L1, a sum of thicknesses of the insulating layer and the passivation layer is L2, a thickness of the color filter layer is L3, a thickness of the planarization layer is L4, a length of the curved screen along the bending edge is X, a bending curvature is K, and a number of the grooves is H, wherein a length of the groove is consistent with a length of the curved screen perpendicular to the bending direction;

wherein a width of each of the plurality of grooves along the bending edge is a, and a depth of the groove is b, then ab≥2XK(L3+L4)(L1+L2+L3+L4)/H.

2. The curved screen of claim 1, wherein the plurality of grooves are strip-shaped grooves and are evenly arranged; wherein after the curved screen is bent, a surface of each of the plurality of grooves is a curved surface, wherein a bending direction of the curved surface is consistent with a bending direction of the curved screen.

3. The curved screen of claim 1, wherein a depth of the groove lies in the range of 0.1 um-1 um, and a width of the groove along the bending direction lies in the range of 2 um-20 um.

4. The curved screen of claim 3, wherein a depth of each of the plurality of grooves is 0.4 um, and a width of each of the plurality of grooves along the bending direction is 8 um.

5. The curved screen of claim 1, wherein a second groove is defined in the insulating layer.

6. A curved screen, comprising a first substrate, a liquid crystal layer, and a second substrate;

wherein the curved screen is bent and concave along the first substrate;

wherein the liquid crystal layer is disposed between the first substrate and the second substrate;

wherein the first substrate comprises a substrate and a planarization layer disposed on a concave side of the substrate;

wherein a plurality of grooves are defined in the planarization layer and disposed at intervals along a direction of a bending edge of the curved screen, and extend in parallel along a direction of a non-bending edge;

wherein each of the plurality of grooves is of a V-shaped structure;

wherein the first substrate further comprises an insulating layer, a passivation layer, and a color filter layer, in addition to the substrate and the planarization layer; wherein the insulating layer is disposed on the substrate, the passivation layer is disposed on the insulating layer, the color filter layer is disposed on the passivation layer, and the planarization layer is disposed on the color filter layer;

wherein a thickness of the substrate is L1, a sum of thicknesses of the insulating layer and the passivation layer is L2, a thickness of the color filter layer is L3, a thickness of the planarization layer is L4, a length of the curved screen along the bending edge is X, a bending curvature is K, and a number of the grooves is H, wherein a length of the groove is consistent with a length of the curved screen perpendicular to the bending direction;

wherein a width of each of the plurality of grooves along the bending edge is a, and a depth of the groove is b, then ab≥2XK(L3+L4)(L1+L2+L3+L4)/H.

7. A display device, comprising a curved screen and a backlight module, wherein the curved screen comprises a first substrate, a liquid crystal layer, and a second substrate; wherein the curved screen is bent and concave along the first substrate; wherein the liquid crystal layer is disposed between the first substrate and the second substrate; wherein the first substrate comprises a substrate and a planarization layer disposed on a concave side of the substrate; wherein a plurality of grooves are defined in the planarization layer and disposed at intervals along a direction of a bending edge direction of the curved screen, and extend in parallel along a direction of a non-perpendicular to the bending edge direction; wherein a depth of each of the plurality of grooves before bending is greater than a depth of the groove after bending;

the curved screen is installed on a side of the backlight module, and the backlight module provides a backlight source for the curved screen;

wherein each of the plurality of grooves is of a V-shaped structure;

wherein the first substrate further comprises an insulating layer, a passivation layer, and a color filter layer, in addition to the substrate and the planarization layer;

wherein the insulating layer is disposed on the substrate, the passivation layer is disposed on the insulating layer, the color filter layer is disposed on the passivation layer, and the planarization layer is disposed on the color filter layer;

wherein a thickness of the substrate is L1, a sum of thicknesses of the insulating layer and the passivation layer is L2, a thickness of the color filter layer is L3, a thickness of the planarization layer is L4, a length of the curved screen along the bending edge is X, a bending curvature is K, and a number of the grooves is H, wherein a length of the groove is consistent with a length of the curved screen perpendicular to the bending direction;

wherein a width of each of the plurality of grooves along the bending edge is a, and a depth of the groove is b, then ab≥2XK(L3+L4)(L1+L2+L3+L4)/H.

* * * * *